(12) United States Patent
Levine et al.

(10) Patent No.: US 8,766,157 B2
(45) Date of Patent: Jul. 1, 2014

(54) HIGH DYNAMIC RANGE CMOS PIXEL AND METHOD OF OPERATING SAME

(75) Inventors: Peter Alan Levine, West Windsor, NJ (US); Rui Zhu, East Brunswick, NJ (US)

(73) Assignee: SRI International, Menlo Park, CA (US)

( * ) Notice: Subject to any disclaimer, the term of this patent is extended or adjusted under 35 U.S.C. 154(b) by 411 days.

(21) Appl. No.: 13/223,991

(22) Filed: Sep. 1, 2011

(65) Prior Publication Data

US 2012/0056079 A1 Mar. 8, 2012

Related U.S. Application Data

(60) Provisional application No. 61/379,504, filed on Sep. 2, 2010.

(51) Int. Cl.
*H01L 31/062* (2012.01)
*H01L 31/113* (2006.01)

(52) U.S. Cl.
USPC ........................................ 250/208.1; 257/290

(58) Field of Classification Search
CPC ............................ H01L 31/062; H01L 31/113

USPC .............................. 250/208.1; 257/290–292
See application file for complete search history.

(56) References Cited

U.S. PATENT DOCUMENTS

| | | | |
|---|---|---|---|
| 2007/0257286 A1* | 11/2007 | Hynecek | 257/292 |
| 2010/0163933 A1* | 7/2010 | Xu et al. | 257/230 |
| 2010/0187401 A1* | 7/2010 | Kawahito | 250/208.1 |
| 2010/0219342 A1* | 9/2010 | Xu et al. | 250/338.4 |

* cited by examiner

*Primary Examiner* — Seung C Sohn
(74) *Attorney, Agent, or Firm* — Marger Johnson & McCollom PC (57) ABSTRACT

A method of operating a CMOS pixel is disclosed. The CMOS pixel includes a photodiode (PPD), a transfer gate coupled to the PPD, and an anti-blooming drain coupled to the transfer gate. A potential barrier is formed between a potential well underlying the PPD and the transfer gate. Charge is accumulated in the potential well in response to electromagnetic radiation during a first integration time. Excess charge is removed from the potential well to the anti-blooming drain that exceeds the first potential barrier. A size of the potential barrier is increased. Charge is accumulated in the potential well during a second integration time.

19 Claims, 7 Drawing Sheets

HIGH DYNAMIC RANGE CMOS PIXEL AND METHOD OF OPERATING SAME

CROSS-REFERENCES TO RELATED APPLICATIONS

This application claims the benefit of U.S. provisional patent application No. 61/379,504 filed Sep. 2, 2010, the disclosure of which is incorporated herein by reference in its entirety.

FIELD OF THE INVENTION

The invention relates generally to imaging devices. More specifically, the invention relates to improving the dynamic range of CMOS pixels.

BACKGROUND OF THE INVENTION

CMOS image sensors first came to the fore in relatively low-performance applications where shuttering was not required, scene dynamic range was low, and moderate to high noise levels could be tolerated. A CMOS sensor technology enabling a higher level of integration of an image array with associated processing circuits would be beneficial to many digital applications such as, for example, in cameras, scanners, machine vision systems, vehicle navigation systems, video telephones, computer input devices, surveillance systems, star trackers, motion detection systems, image stabilization systems and high-definition television imaging devices.

The advantages of CMOS imagers over CCD imagers are that CMOS imagers have a low voltage operation and low power consumption; CMOS imagers are compatible with integrated on-chip electronics (control logic and timing, image processing, and signal conditioning such as A/D conversion); and CMOS imagers allow random access to the image data. On-chip integration of electronics is particularly advantageous because of the potential to perform many signal conditioning functions in the digital domain (versus analog signal processing) as well as to achieve a reduction in system size and cost.

Figure 1A:
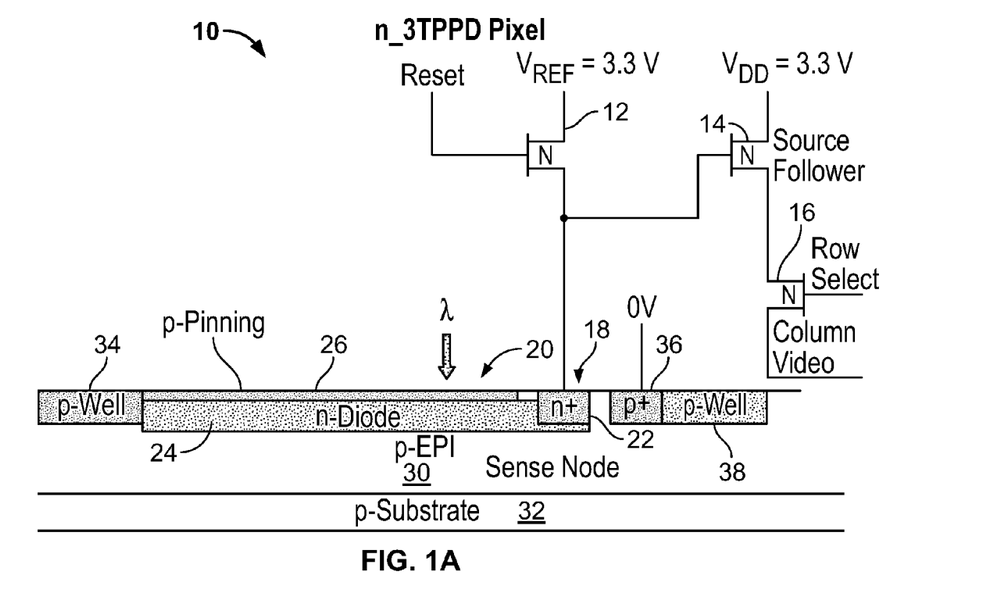
FIGS. 1A and 1B are circuit schematics of conventional CMOS pixels known as a 3T pixel (for three-transistor pixel) and a 5T pixel (for five-transistor pixel), respectively.
Figure 1B:
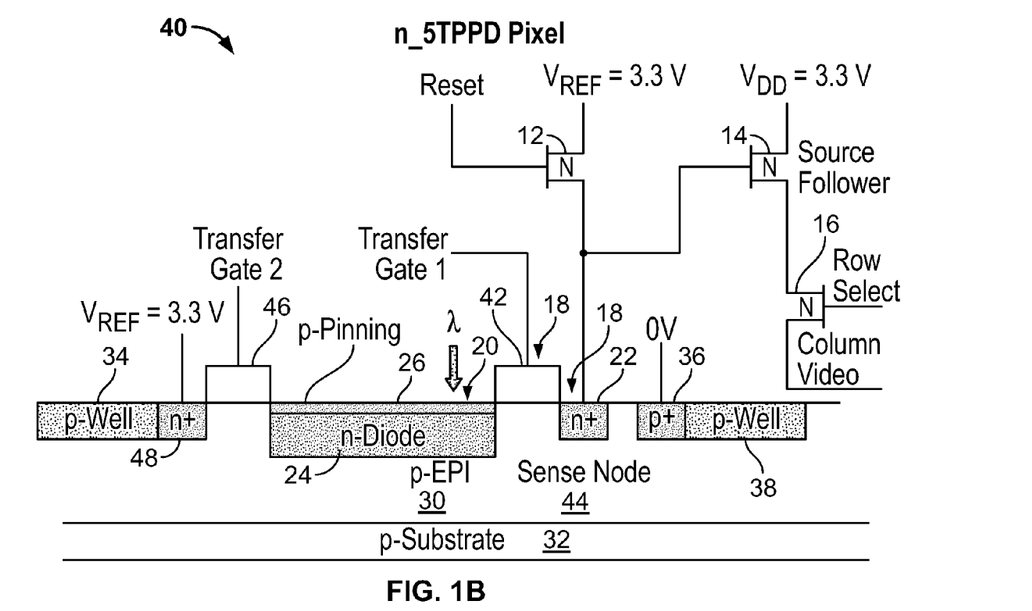

FIGS. 1A and 1B are cross-sectional views of conventional CMOS pixels known as 3T pixels (for three-transistor pixel) and 5T pixels (for 3-transistor plus 2-transfer gate pixel). More precisely, the 3T pixel 10 of FIG. 1A includes three NMOS transistors 12, 14, 16 standing for a reset transistor 12, a source follower transistor 14 and a row transistor 16. The reset transistor 12 is electrically connected to a sense node 18. The sense node 18 is formed of an n+ sense node diffusion 22 and a pinned photodiode 20. The pinned photodiode 20 includes a thin p-type pinning layer 26 overlying a custom n-diode implant 24, that in turn, overlies and forms a depletion region with a p-epitaxial layer 30. A p-substrate 32 underlies the p-epitaxial layer 30. A p-well 34 is formed adjacent the pinned photodiode 20 in the p-epitaxial layer 30 for isolating the 3T pixel 10 from neighboring pixels. A p+ return contact 36 is formed proximal to the other side of the pinned photodiode 20 and is held at ground potential (about 0V) for providing a return and ground reference for the 3T pixel. A p-well 38 is formed adjacent to the p+ return contact 36.

When operated, a RESET CLOCK (about 3.3 V) applied to the gate of the reset transistor 12 causes a reverse bias on the pinned photodiode 20. The source follower transistor 14 and the row transistor 16 are coupled between a drain supply $V_{DD}$ of about 3.3V and an output signal terminal COLUMN VIDEO. The drain of the reset transistor 12 is connected to $V_{DD}$; the gate of the reset transistor 12 is connected to a RESET clock; and the source of the reset transistor 12 is connected to the cathode of the pinned photodiode 20 so that the reset transistor 12 operates as a switch. The source of the source follower transistor 14 is connected to the drain of the row transistor 16, and the source of the row transistor 16 is connected to output terminal COLUMN VIDEO. In applications, a plurality of such 3T pixels is coupled to the same output terminal COLUMN VIDEO. By selectively applying row address signal ROW SELECT to the gate of the selected row transistor 16, different rows may be coupled to the output terminal COLUMN VIDEO (i.e., a column bus).

The 5T pixel 40 (FIG. 1B), also known as a charge transfer pixel, is similar to the 3T pixel 10 (FIG. 1A) except that the 5T pixel 40 has a transfer gate 42 coupled between the sense node 44 and the pinned photodiode 20. The sense node 44 may be isolated from the pinned photodiode 20 by transfer gate 42. As a result, charge may be transferred from a photodetection region to the sense node 44 when a positive voltage, for example 3.3 V, is applied to the input TRANSFER GATE 1, where a resulting voltage is read out by the source follower transistor 14.

The 5T pixel 40 also includes a second transfer gate 46 abutting the side of the pinned photodiode 20 distal to the transfer gate 42. An n+ drain 48 is formed adjacent to the sense node 44 distal to the pinned photodiode 20 and is also tied to $V_{REF}$ (about +3.3 V). The second transfer gate 46 may be used as a global reset for the imager and as an antiblooming gate for preventing excess charge generated in the pinned photodiode 20 from "blooming" through the transfer gate 42 to the sense node 44 when a voltage is applied to the input TRANSFER GATE 2 that is more positive than the transfer gate-to-sense node voltage.

Figure 2A:
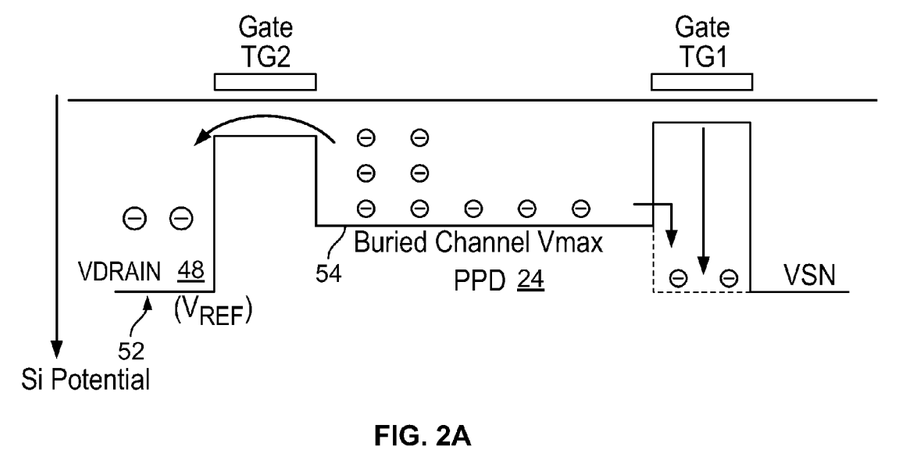
FIG. 2A is a potential diagram illustrating conventional operation of the 5T pixel of FIG. 1B.
Figure 2B:
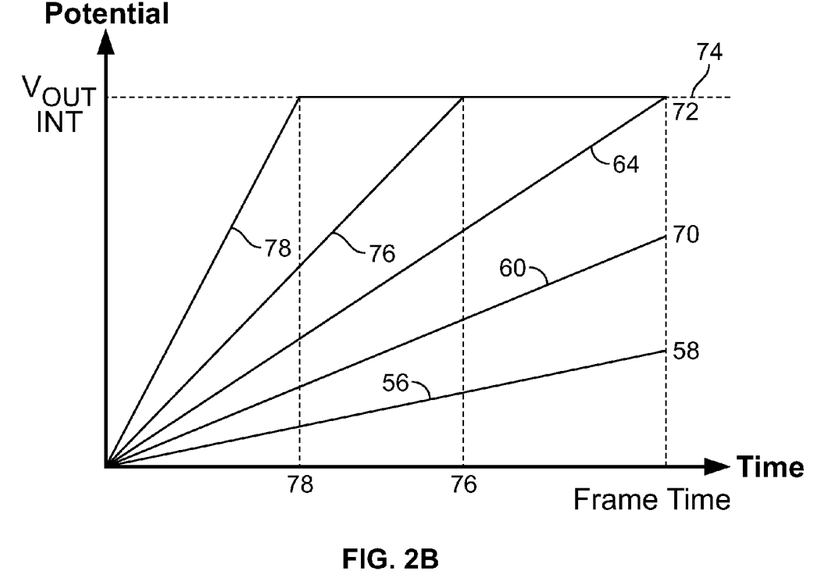
FIG. 2B shows a plot of signal output (voltage) of the 5T pixel of FIG. 1B during an integration time for various incoming illumination levels.

FIG. 2A is a potential diagram illustrating conventional operation of the 5T pixel 40 of FIG. 1B. FIG. 2B shows a plot of signal output (voltage) of the 5T pixel 40 of FIG. 1B during an integration time for various incoming illumination levels. Referring now to FIGS. 1B, 2A, and 2B, the p+ pinning region 26 of the photodiode 24 (hereinafter PPD 24) is generally held at ground potential and is also grounded to the substrate 32, while the n+ contact 48 (hereinafter the the anti-blooming drain 48) is formed adjacent to the second transfer gate 44 (hereinafter TRANSFER GATE 2) distal to the PPD 24 and may be tied to $V_{REF}$ (about +3.3 V). During an integration time, charge accumulates in the PPD 26. When TRANSFER GATE 1 is set to a logical "high" (about +3.3 V), the potential under TRANSFER GATE 1 "falls" toward $V_{REF}$, and charge moves towards the sense node 44 where it is converted to a voltage and read out by a combination the reset transistor 12, the source follower transistor 14, and the row transistor 16 and external circuitry.

Referring now to FIG. 2B, if the incoming light level is relatively low, the voltage output of the 5T pixel 40 has a first slope 56 that is substantially monotonically increasing and rises to a level 58 at the end of an integration time. For the same 5T pixel 40 having a higher incoming light level, more charge accumulates in the PPD 26 and thus more charge is transferred and integrated in the same time interval. As a result, the corresponding integrated output voltages have correspondingly greater slopes 60, 64 and higher final output voltages 70, 72, respectively. Above a certain incoming light level, the pixel saturates by spilling over charge into the anti-blooming drain 48, so that the final slope of the output voltage flattens out at a saturation voltage 74 at earlier times 76, 78. Thus, dynamic range is limited.

Accordingly, what would be desirable, but has not yet been provided, is a method of operating a CMOS pixel that may operate over a larger dynamic range.

SUMMARY OF THE INVENTION

The above-described problems are addressed and a technical solution achieved in the art by providing a method of operating a CMOS pixel. The CMOS pixel includes a photodiode (PPD), a transfer gate coupled to the PPD, and an anti-blooming drain coupled to the transfer gate. A potential barrier is formed between a potential well underlying the PPD and the transfer gate. Charge is accumulated in the potential well in response to electromagnetic radiation during a first integration time. Excess charge is removed from the potential well to the anti-blooming drain that exceeds the first potential barrier. A size of the potential barrier is increased. Charge is accumulated in the potential well during a second integration time. The accumulated charge remains within the potential well during the second integration time such that a response signal of the CMOS pixel remains within a linear region.

In an embodiment, increasing the size of the potential barrier may include increasing a magnitude of a potential applied to the transfer gate from a first level before the first integration time to a second level at the second integration time. The size of the potential barrier may be increased non-linearly as a function of time. The size of the potential barrier may increased in discrete steps over time or continuously over time. The second integration time may be shorter than the first integration time.

In an embodiment, the method may further include operating the transfer gate with narrow pulses to momentarily reduce well capacity of the PPD. Voltage applied to the transfer gate may be adjusted for each subsequent pulse, resulting in less reduction of well capacity with respect to the previous pulse. Spacing in time for the pulses may be reduced for a subsequent sub-integration time.

The above-described problems are addressed and a technical solution achieved in the art by providing a method of operating a CMOS pixel. The CMOS pixel includes a sense node, a photodiode (PPD) coupled to the sense node, a transistor coupled to the sense node, a capacitor coupled to the transistor coupled to the sense node, a reset transistor coupled to the capacitor and in series with the transistor coupled to the sense node, a transfer gate coupled to the PPD, and an anti-blooming drain coupled to the transfer gate. The method may include (a) coupling a capacitor to the sense node; (b) forming a potential barrier between a potential well underlying the PPD and the transfer gate; (c) accumulating charge in the potential well in response to electromagnetic radiation during a first integration time; (d) removing excess charge from the potential well to the anti-blooming drain that exceeds the first potential barrier; (e) increasing a size of the potential barrier; (f) accumulating charge in the potential well during a second integration time; and (g) decoupling the capacitor from the sense node. Steps (a)-(g) may be performed over two consecutive frames or within a single frame.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Referring again to FIG. 1B, according to an embodiment of the present invention, the 5T pixel 40 may operate with high dynamic range by an incremental skimming of photocharge from the PPD 24. This improves optical dynamic range by partial removal of overload charge. The light level falling on the PPD 24 may exceed a value that would normally overfill the charge capacity of the pinned photodiode 24. In the following discussion, TRANSFER GATE 2 is used as an example. TRANSFER GATE 2, in conjunction with the potential 54 below the PPD 24, may be manipulated to produce a nonlinear response. More particularly, the potential of TRANSFER GATE 2 in the region 54 may be manipulated to control charge capacity of the PPD 24.

Figure 3A:
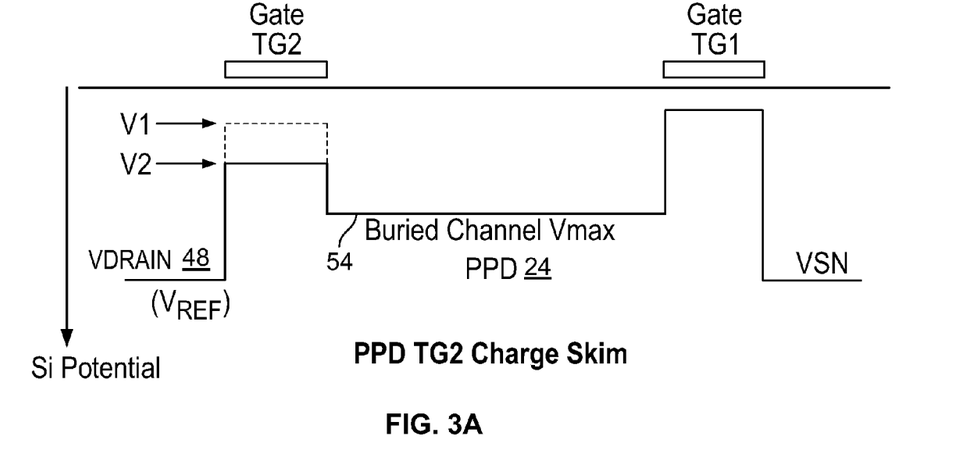
FIG. 3A is a potential diagram depicting a method of modulating voltage applied to TRANSFER GATE 2 to increase the charge capacity of the (pinned photo-diode) PPD in the 5T pixel of FIG. 1B, according to an embodiment of the present invention.
Figure 3B:
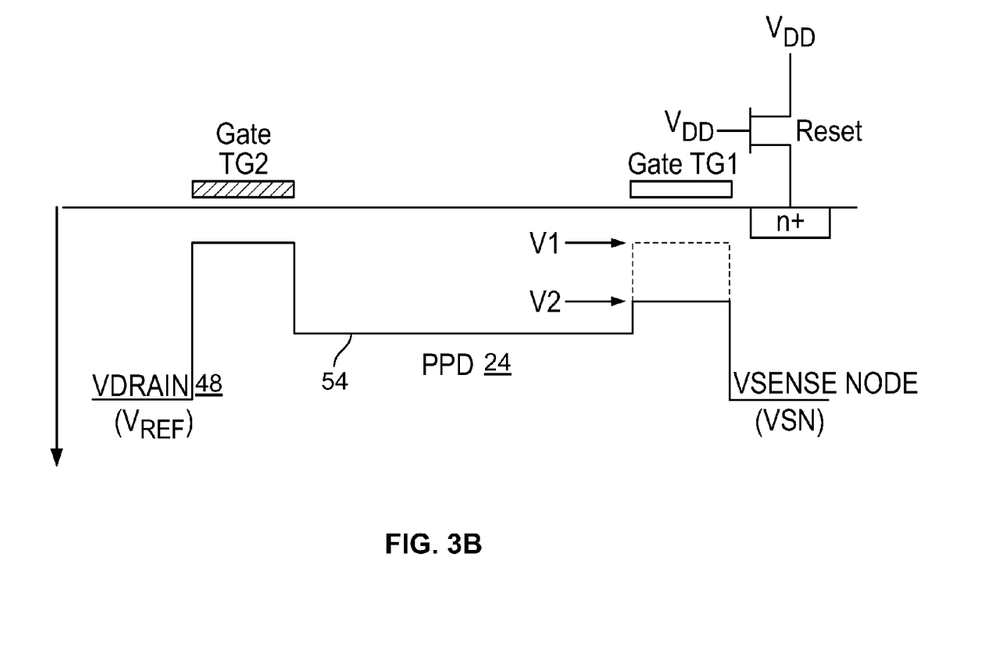
FIG. 3B is a potential diagram depicting a method of modulating voltage applied to TRANSFER GATE 1 with reset transistor turned on so that the sense node is held at $V_{DD}$ to provide a drain to increase the charge capacity of the (pinned photo-diode) PPD in the 5T pixel of FIG. 1B, according to an embodiment of the present invention.

FIGS. 3A and 3B are a potential diagram depicting a method of modulating voltage applied to TRANSFER GATE 1 or 2 to increase the charge capacity of the PPD 26, according to an embodiment of the present invention. Referring now to FIGS. 1B and 3A, initially, the potential of TRANSFER GATE 2 is set to a potential level, V2, so that there is a relatively small potential barrier between the potential 54 below the PPD 26 and TRANSFER GATE 2. For incoming light intensity below a predetermined level, all photoelectrons generated are stored in the PPD 26 with no loss in sensitivity. As the incoming light level increases, charge "spills" over the relatively low potential barrier between the region 54 below the PPD 26 and TRANSFER GATE 2 into the antiblooming drain 48. As a result, charge is selectively removed from the PPD 26 by TRANSFER GATE 2. When potential applied to TRANSFER GATE 2 is set to a potential level, V1, so that there is a relatively large potential barrier between the region 54 below the PPD 26 and TRANSFER GATE 2. For an n-buried channel, the well capacity of the PPD 26 is increased. Voltage polarities reverse for p-well CMOS pixels.

As a result of increasing the potential barrier between the PPD 26 and the TRANSFER GATE 2, more charge may be integrated in a linear fashion before exceeding the potential barrier at V1 and spilling over into the anti-blooming drain 48.

In one embodiment, as light level increases, a greater portion of photo charge may be removed via the antiblooming drain 48. This produces a nonlinear response to light in the PPD 26 and compresses bright portions of a scene so gray scale details become visible, which would normally be lost. This is effected by varying the applied voltage to TRANSFER GATE 2 during the optical integration time. The TRANSFER GATE 2 voltage may be controlled in a continuous way or in discrete steps. In a preferred embodiment, using discrete steps is most practical for 2-dimensional CMOS arrays. When using discrete steps, the optical integration time is broken into two or more sub-integration times. For each sub-integration time, the charge collecting well is increased in size. Each new sub-integration time is shorter than the previous time.

In an embodiment, FIG. 3B shows how TRANSFER GATE 1 (TG1) may operate in a similar fashion as TRANSFER GATE 2 (TG2). The same results shown in FIG. 3A may be achieved as shown in FIG. 3B by varying the applied voltage to TRANSFER GATE 1 and having the sense node 44 serve as a drain. This may be effected by holding the reset transistor 12 turned on, thererby holding the n+ sense node diffusion 22 to approximately $V_{DD}$ wherein $V_{DD}$ is greater in magnitude than the potential of the buried channel $V_{MAX}$ 54. When the pixel 40 is being read out, the reset transistor 12 channel is turned off by removing the potential $V_{DD}$ from the reset transistor 12, so that the n+ sense node diffusion 22 is floating. After some period (e.g., about half a line time) TRANSFER GATE 1 has a potential applied to it so that charge transfers from the PPD 26 to the sense node 44. After the reset transistor 12 has been turned off but before TRANSFER GATE 1 has been turned on, the voltage on the sense node 44 contains a noise component that forms a clamp shelf providing a reference for sense node kTC reset noise.

More particularly, and referring now to FIGS. 1B and 3B, initially, the potential of TRANSFER GATE 1 is set to a potential level, V2, so that there is a relatively small potential barrier between the potential 54 below the PPD 26 and TRANSFER GATE 1. For incoming light intensity below a predetermined level, all photoelectrons generated are stored in the PPD 26 with no loss in sensitivity. As the incoming light level increases, charge "spills" over the relatively low potential barrier between the region 54 below the PPD 26 and TRANSFER GATE 1 into the n+ sense node diffusion 22. As a result, charge is selectively removed from the PPD 26 by TRANSFER GATE 1. When potential applied to TRANSFER GATE 1 is set to a potential level, V1, so that there is a relatively large potential barrier between the region 54 below the PPD 26 and TRANSFER GATE 1. For an n-buried channel, the well capacity of the PPD 26 is increased. Voltage polarities reverse for p-well CMOS pixels.

As a result of increasing the potential barrier between the PPD 26 and the TRANSFER GATE 1, more charge may be integrated in a linear fashion before exceeding the potential barrier at V1 and spilling over into the n+ sense node diffusion 22.

In one embodiment, as light level increases, a greater portion of photo charge may be removed via the n+ sense node diffusion 22. This produces a nonlinear response to light in the PPD 26 and compresses bright portions of a scene so gray scale details become visible, which would normally be lost.

Figure 4:
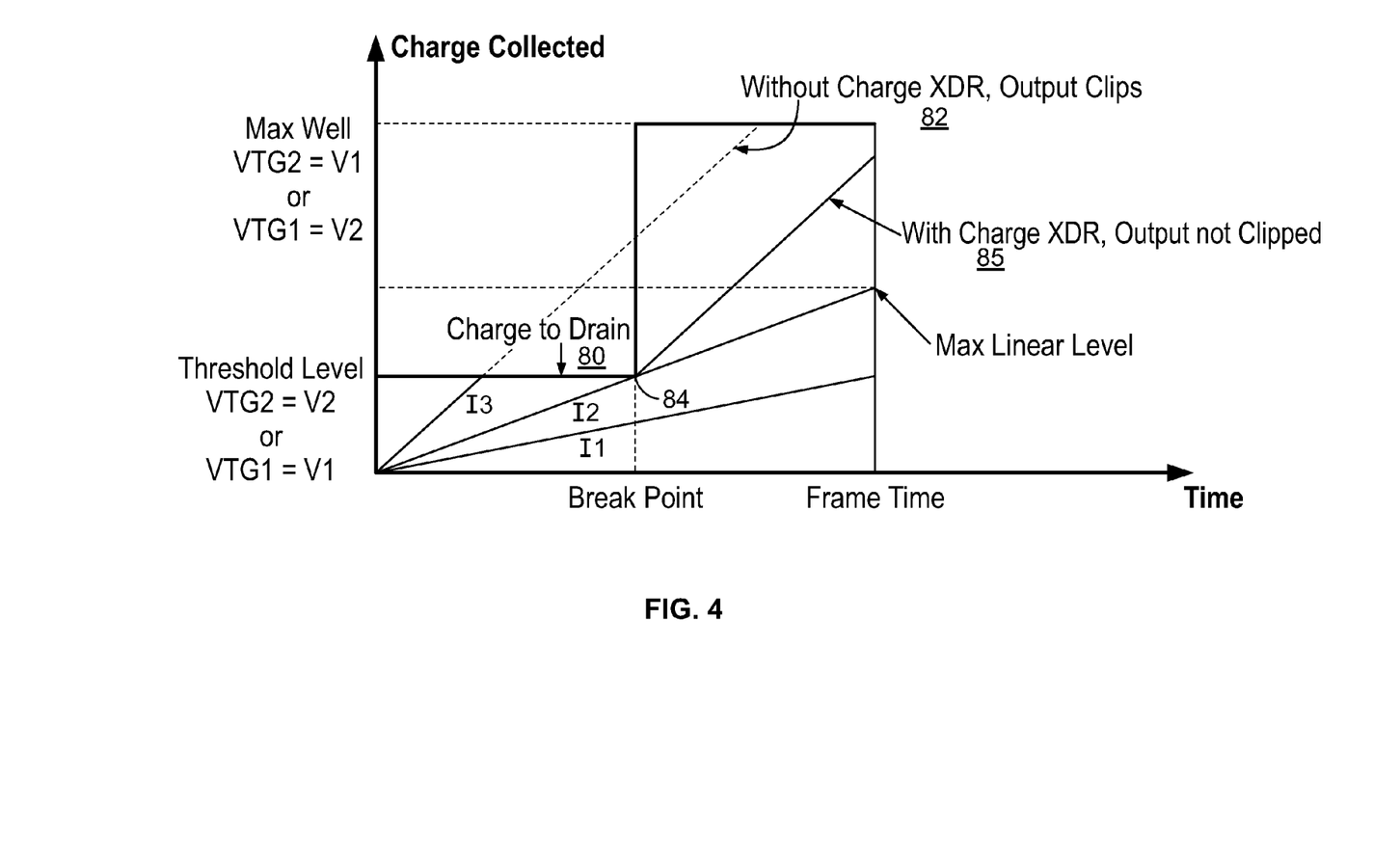
FIG. 4 is a plot of charge collected versus frame time with TRANSFER GATE 1 or 2 varied in two steps, according to an embodiment of the present invention.

FIG. 4 is a plot of charge collected versus frame time with TRANSFER GATE 1 or 2 varied in two steps, according to an embodiment of the present invention. Referring now to FIGS. 1B and 4, and using TRANSFER GATE 2 as an example, with increasing levels of light intensity and TRANSFER GATE 2 set to potential V2, signal response voltage rises with correspondingly increasing slope from line I1 to a maximum linear rate at line I2 without being saturated at the end of frame time. If incoming light intensity is large, correspondingly more charge is integrated at a faster rate, as illustrated by the line I3. If the potential difference between TRANSFER GATE 2 and the region 54 under the PPD 26 is not changed, charge is removed from the 5T pixel 40 to the antiblooming drain 48. As a result, charge collected saturates at a level 80 instead of continuing higher in a linear fashion as illustrated by the dotted portion 82 of line I3. If, at a break point 84 of line I3, the potential difference between TRANSFER GATE 2 and the PPD 26 is increased to V1 (i.e., the collection well size is increased), the response line I3 again rises in a linear fashion at segment 85 of line I3 and remains within a linear region at the end of integration frame time. Thus, greater light intensities become quantifyable.

Figure 5:
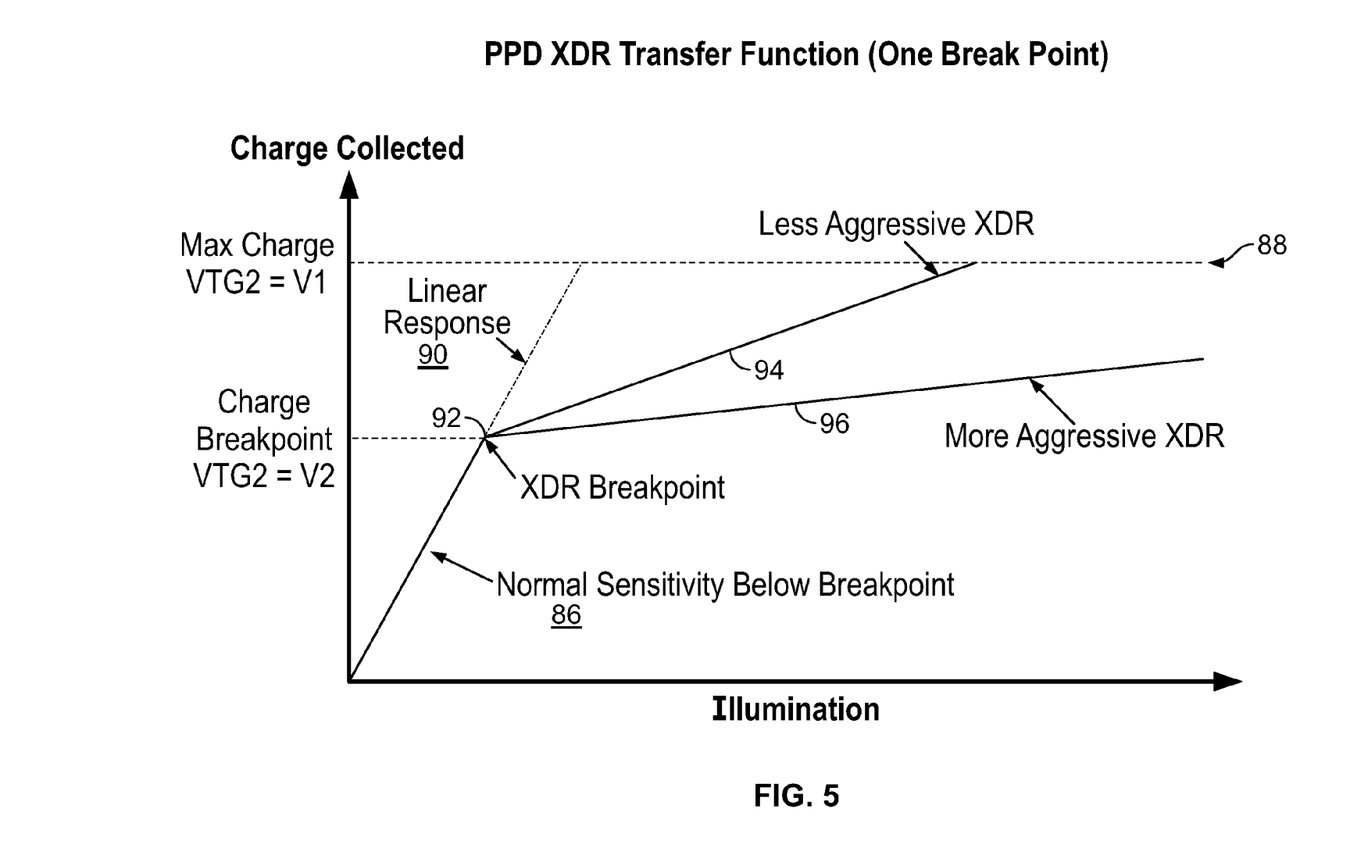
FIG. 5 are plots of charge collected versus illumination with TRANSFER GATE 1 or 2 varied in two steps, according to an embodiment of the present invention.

FIG. 5 are plots of charge collected versus illumination with TRANSFER GATE 2 varied in two steps, according to an embodiment of the present invention. Referring now to FIGS. 1B and 5, initially, charge collects according to an initial rate as depicted by line segment 86 when the maximum charge, i.e., the TRANSFER GATE 2 voltage, is set to V1. If the potential of TRANSFER GATE 2 is not changed, the charge collection rate attempts to rise to a maximum charge level 88 at the same rate as indicated by the dotted line 90, but saturates. If the size of the collection potential under TRANSFER GATE 2 is initialliy V2 and then changed to V1 at breakpoint 92, some charge is spilled into the antiblooming drain 48, but then continues to rise linearly with a shallower-rising slope as shown by the solid line segment 94 due to reduce integration time after the barrier is stepped up. If charge is "dumped" at a more aggressive rate, i.e., via a shallower well potential difference between TRANSFER GATE 2 and the PPD 26, or a short time between the sep up and the end of integration or both then less charge is collected as shown by the solid line segment 96, and dynamic range is extended further.

According to an embodiment, the same results shown in FIGS. 4 and 5 may be achieved using TRANSFER GATE 1 and having the sense node 44 serve as a drain. This may be effected by holding the reset transistor 12 turned on, thereby holding the n+ sense node diffusion 22 to approximately $V_{DD}$.

Figure 6:
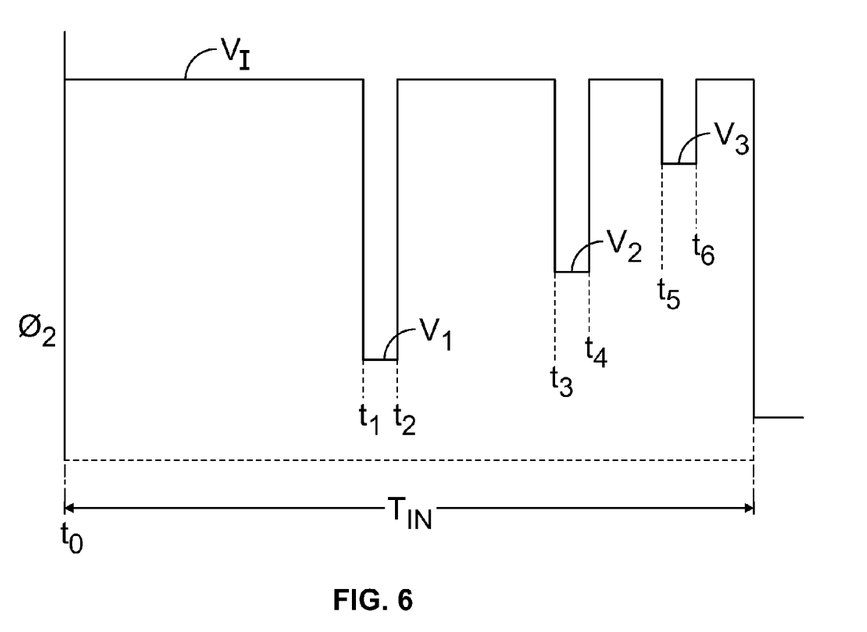
FIG. 6 depicts a method of operating TRANSFER GATE 1 or 2 using narrow pulses to momentarily reduce well capacity of the PPD in the 5T pixel of FIG. 1B, according to an embodiment of the present invention.
Figure 7:
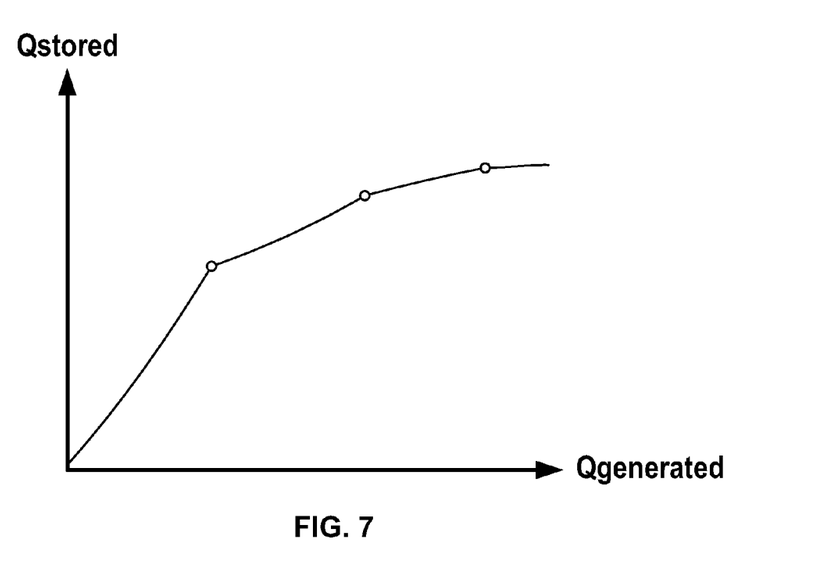
FIG. 7 is a plot of charge collected versus illumination for an embodiment of a method of operation of the 5T pixel of FIG. 1B with several break points, according to an embodiment of the present invention.

According to an embodiment of the present invention, additional circuits may be added to control TRANSFER GATE 2 voltage during the optical integration period to "switch" from smaller differences in potential to larger differences in potential between TRANSFER GATE 2 and the PPD 26. In one embodiment, the external circuits may to provide a variable voltage to TRANSFER GATE 2 for each pixel in a 1-dimensional or 2-dimensional array. Operation may be in progressive scan or snap shot mode. In one embodiment, TRANSFER GATE 2 may be operate to use narrow pulses to momentarily reduce well capacity of the PPD 26 as shown in FIG. 6. Voltage is adjusted for each subsequent pulse, resulting in less reduction of well capacity with respect to the previous pulse. The spacing in time for the pulses is reduced in each subsequent sub-integration time. This creates a monotonically decreasing slope characteristic of photo carriers stored versus photo carriers generated as shown in the plot of FIG. 7. Effectively, integration time is reduced for higher light levels. The TRANSFER GATE 2 voltage over time controls the shape of the nonlinear response and therefore dynamic range.

This type of operation can extend high light gray scale several orders of magnitude beyond the point where blooming control hard clips while not degrading low light performance.

According to an embodiment of the present invention, operation in this mode is applicable to any CMOS pixel having a dump drain (e.g., the antiblooming gate 48) and a control gate to a dump drain (e.g., TRANSFER GATE 2). This method may be applied to 3T, 4T, 5T, 6T, or non-T pixels, etc.

Figure 8:
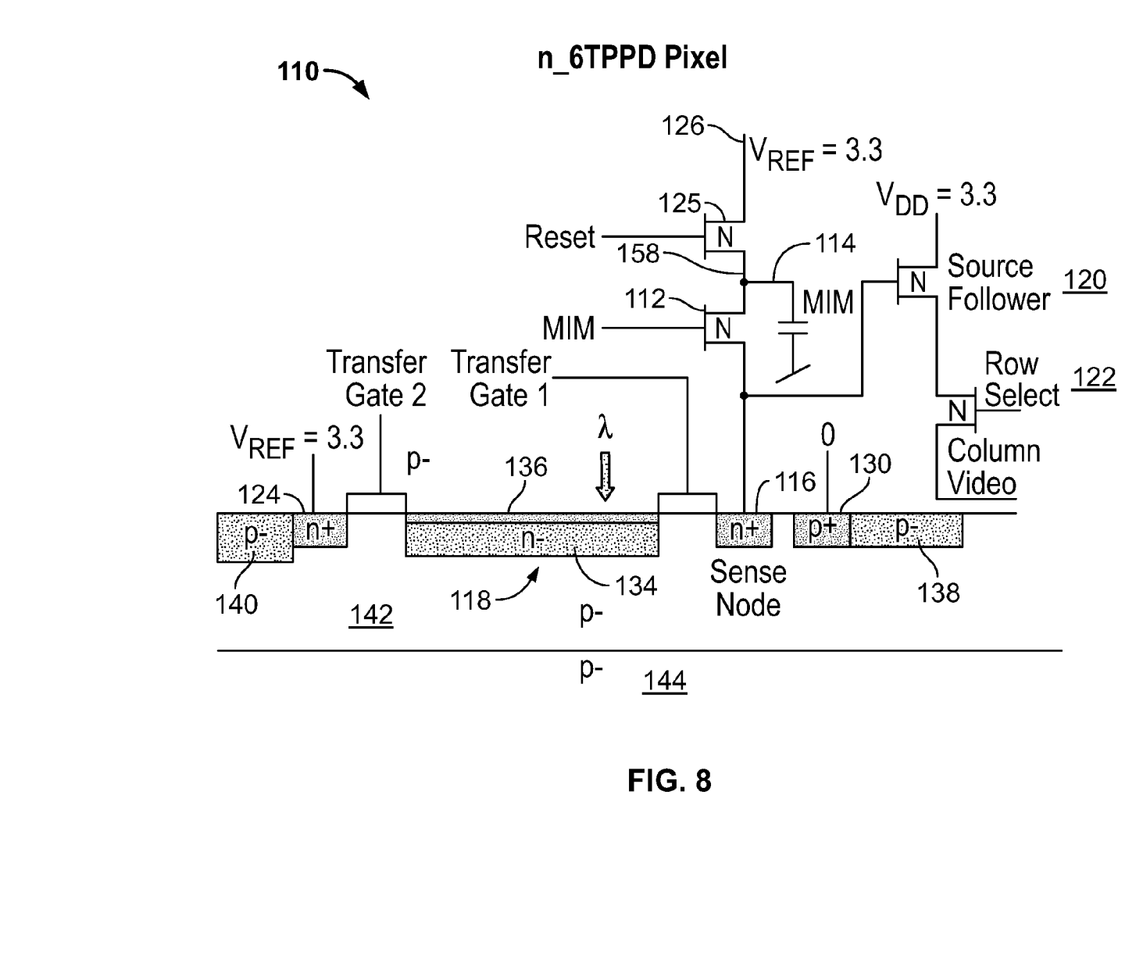
FIG. 8 depicts a high dynamic range CMOS six transistor pinned photodiode pixel (6TPPD pixel), according to an embodiment of the present invention.

According to an embodiment of the present invention, a high dynamic range CMOS six transistor pinned photodiode pixel (6TPPD pixel) 110 is depicted in FIG. 8. A pinned photodiode pixel with five transistors is augmented with a sixth transistor (i.e., a MIM MOSFET 112) and a small capacitor (i.e., a MIM capacitor 114) in the 6TPPD 110. The MIM MOSFET 112 is used to select a high or low V/e− gain within the 6TPPD 110 by connecting the metal-insulator-metal (MIM) capacitor 142 to the pixel sense node 116 for extended dynamic range. The MIM capacitor 114 is formed by a multi-level metal stack with specially engineered dielectric thickness to achieve high capacitance per unit area as described in co-pending, commonly owned, U.S. patent application Ser. No. 13/169,242, filed Jun. 27, 2011, the disclosure of which is incorporated herein by reference in its entirety.

The 6TPPD 110 employs a pinned photodiode 118 (i.e., the PPD 118) for photocharge integration. The 6TPPD 110 includes a sense node 116 with a source follower transistor 120 and a row select transistor 120. In operation, the PPD 118 is configured to transfer charge through TRANSFER GATE 1 to the sense node 116 or through TRANSFER GATE 2 to a drain 124. The sense node 116 includes a series connection of a reset transistor 125 and the MIM MOSFET 112 to a reset drain 126. One terminal of the MIM capacitor 114 is electrically connected to an intermediate node 158 between the two transistors 112, 125.

According to an embodiment of the present invention, the 6TPPD 110 is configured as an n-type CMOS pixel. According to an embodiment of the present invention, the conductivity type of the transistors 112, 120-125, the nodes 116, 124, 130, the regions 134, 136, 138, 140, the epi layer 142, and the substrate 144 may be reversed to form a functioning p-type CMOS pixel. In an n-type 6TPPD pixel (otherwise known as an NMOS pixel), the carrier type is electrons, while in a p-type 6TPPD pixel (otherwise known as an PMOS pixel), the carrier type is holes. According to certain embodiments of the present invention, the n-type 6TPPD or p-type 6TPPD pixels/imagers may be either front-illuminated or back-illuminated.

The 6TPPD 140 may operate in at least three modes, as described hereinbelow.

High Dynamic Range Mode 1

The 6TPPD 110 may be operated with high dynamic range by (1) taking a reset sample and then a signal sample with the MIM capacitor 114 electrically connected to the sense node 116 via operation of the MIM MOSFET 112 (i.e., the MIM MOSFET 112 is switched to an ON state), performing correlated double sampling (CDS) to create a high saturation, low uV/e signal processed sample; (2) taking a reset sample and then a signal sample with the MIM capacitor 114 not connected to the sense node (i.e., the MIM MOSFET 112 is switched to an OFF state), performing CDS to create a lower saturation, high uV/e, low noise signal processed sample; and (3) combining the two signal processed samples to achieve an extended, high dynamic range.

This operation may be achieved using two consecutive frames (one high gain frame and one low gain frame), or with more complicated timing and additional row control circuits achieved within a single frame.

As an alternate implementation, instead of employing TRANSFER GATE 2, a path may be created employing TRANSFER GATE 1, the MIM MOSFET 112, and the reset MOSFET 154.

If the MIM capacitor 114 is not switched onto the sense node 116, then the 6TPPD 110 may operates with a maximum uV/e−, resulting in highest sensitivity. If the MIM capacitor 114 is switched onto the sense node 116, then sensitivity is reduced, but maximum signal electrons may be stored on the sense node 116. The advantage of operating with the MIM capacitor 114 switched onto the sense node 116 is the ability to discern finer grey scale levels in high lighting conditions where the PPD 118 is operating in a non-linear compressed mode.

High Dynamic Range Mode 2

The 6TPPD 110 may be operated with high dynamic range by applying a logical "low" (about 0 V) to the MIM MOSFET 112 such that MIM capacitor 114 is not switched onto the sense node 116. As a result, in an embodiment, the 6TPPD 110 may be operated effectively as a 5TPPD pixel as described above in FIGS. 2A-7.

High Dynamic Range Mode 3

Mode 3 employs a combination of mode 1 and mode 2. Mode 1 and mode 2 control voltages and timing may be set to produce a smooth transition for nonlinear characteristics from mode 1 to mode 2. For pixels with higher light levels, the extra sense node capacitance is turned on and mode 2 selective removal of charge is initiated to give the nonlinear charge response for the PPD 118.

For example, the first PPD charge removal break point may be set to 10,000 electrons stored in the PPD 118. Shot noise may be 100 electrons for that signal so the high value capacitance of the sense node 116 is turned on. For higher light levels, mode 2 nonlinear response is used to extend high end optical input orders of magnitude higher than the capacity of the PPD 118.

The combination of mode 1 and 2 is advantageous in that the capacity of the sense node 116 is large when the light input level of the PPD 118 is extended and the charge domain image is compressed. The larger capacitance of the sense node 116 permits more gray scale levels to be resolved in compressed bright areas of the scene for mode 2 operation. Therefore, at very low light levels, minimum capacitance is set at the sense node 116, giving best possible low light performance. At very high light levels where there is compression of collected charge at the PPD 118, the capacitance of the sense node 116 may be increased so there is improved gray scale resolution in the charge compressed mode 2 signal.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method of operating a CMOS pixel, wherein the CMOS pixel comprises a photodiode (PPD), a transfer gate coupled to the PPD, and an anti-blooming drain coupled to the transfer gate, the method comprising:
   forming a potential barrier between a potential well and the transfer gate;
   accumulating charge in the potential well in response to electromagnetic radiation during a first integration time;
   removing excess charge from the potential well to the anti-blooming drain that exceeds the potential barrier;
   increasing a size of the potential barrier; and
   accumulating charge in the potential well during a second integration time.

2. The method of claim 1, wherein the accumulated charge remains within the potential well during the second integration time such that a response signal of the CMOS pixel remains within a linear region.

3. The method of claim 1, wherein increasing the size of the potential barrier comprises increasing a magnitude of a potential applied to the transfer gate from a first level before the first integration time to a second level at the second integration time.

4. The method of claim 1, wherein the size of the potential barrier is increased non-linearly as a function of time.

5. The method of claim 4, wherein the size of the potential barrier is increased in discrete steps over time.

6. The method of claim 4, wherein the size of the potential well is increased continuously over time.

7. The method of claim 1, wherein the second integration time is shorter than the first integration time.

8. The method of claim 1, further comprising operating the transfer gate with a plurality of narrow pulses.

9. The method of claim 8, wherein voltage applied to the transfer gate is adjusted for each of the plurality of narrow pulses.

10. The method of claim 8, wherein spacing in time for each of the plurality of narrow pulses is reduced for a subsequent sub-integration time.

11. A method of operating a CMOS pixel, wherein the CMOS pixel comprises a photodiode (PPD), a transfer gate coupled to the PPD, and an anti-blooming drain coupled to the transfer gate, the method comprising:
   (a) coupling a capacitor to the sense node;
   (b) forming a potential barrier between a potential well underlying the PPD and the transfer gate;
   (c) accumulating charge in the potential well in response to electromagnetic radiation during a first integration time;
   (d) removing excess charge from the potential well to the anti-blooming drain that exceeds the first potential barrier;
   (e) increasing a size of the potential barrier;
   (f) accumulating charge in the potential well during a second integration time; and
   (g) decoupling the capacitor from the sense node.

12. The method of claim 11, wherein steps (a)-(g) are performed over two consecutive frames.

13. The method of claim 11, wherein steps (a)-(g) are performed within a single frame.

14. The method of claim 11, wherein the accumulated charge remains within the potential well during the second integration time such that a response signal of the pixel remains within a linear region.

15. The method of claim 11, wherein increasing the size of the potential barrier comprises increasing a magnitude of the potential applied to the transfer gate from a first level before the first integration time to a second level before the second integration time period.

16. The method of claim 11, wherein the size of the potential barrier is increase non-linearly as a function of time.

17. The method of claim 16, wherein the size of the potential barrier is increased in discrete steps over time.

18. The method of claim 16, where the size of the potential well is increased continuously over time.

19. The method of claim 11, wherein the second integration time is shorter than the first integration time.

* * * * *